United States Patent [19]

Haines

[11] 4,237,821

[45] Dec. 9, 1980

[54] LOADER FEEDER APPARATUS FOR LOADING AND FEEDING BALES OF HAY AND THE LIKE

[76] Inventor: H. M. Haines, 1905 E. Broadway, Altus, Okla. 73521

[21] Appl. No.: 87,010

[22] Filed: Oct. 22, 1979

[51] Int. Cl.³ .............................. A01K 5/00; B60P 1/04
[52] U.S. Cl. ........................................ 119/60; 414/24.5
[58] Field of Search ................... 119/60, 58; 414/24.5, 414/685

[56] References Cited

U.S. PATENT DOCUMENTS

| 3,949,706 | 4/1976 | Coon, Jr. ........................... | 119/60 |
| 3,995,594 | 12/1976 | Rose ................................. | 119/60 |
| 4,037,741 | 7/1977 | Smith ........................... | 414/24.5 X |
| 4,062,454 | 12/1977 | Priefert ........................... | 414/24.5 |
| 4,126,234 | 11/1978 | Wells ............................. | 414/24.5 |

*Primary Examiner*—Hugh R. Chamblee
*Attorney, Agent, or Firm*—Dunlap, Codding & McCarthy

[57] ABSTRACT

An improved loader feeder apparatus for loading, transporting and feeding bales of hay and the like which includes a tine assembly connected to an axle which is pivotally movable on the axle to a loading position wherein a portion of the tine assembly is engagable with a bale of hay and the like for securing the bale of hay and the like to the tine assembly and which is pivotally movable on the axle to a hauling position wherein the tine assembly cooperates to support a bale of hay and the like a distance above the ground for transporting the bale of hay and the like to various locations. The loader feeder apparatus includes a rear wall assembly which is connected to the axle, a first side wall assembly which is connected to the rear wall assembly, a second side wall assembly which is connected to the rear wall assembly, a first gate assembly which is hingedly connected to the first side wall assembly and a second gate assembly which is hingedly connected to the second side wall assembly. The rear wall assembly, the side wall assemblies and the gate assemblies cooperate to encompass and support a portion of the bale of hay and the like supported on the tine assembly in one position of the gate assemblies. One end of a tongue assembly is pivotally connected to the axle and means are included for moving the apparatus to a loading position wherein the tines are engagable with a bale of hay and the like and to a hauling position wherein the tines support the bale of hay and the like a distance above the ground surface.

12 Claims, 8 Drawing Figures

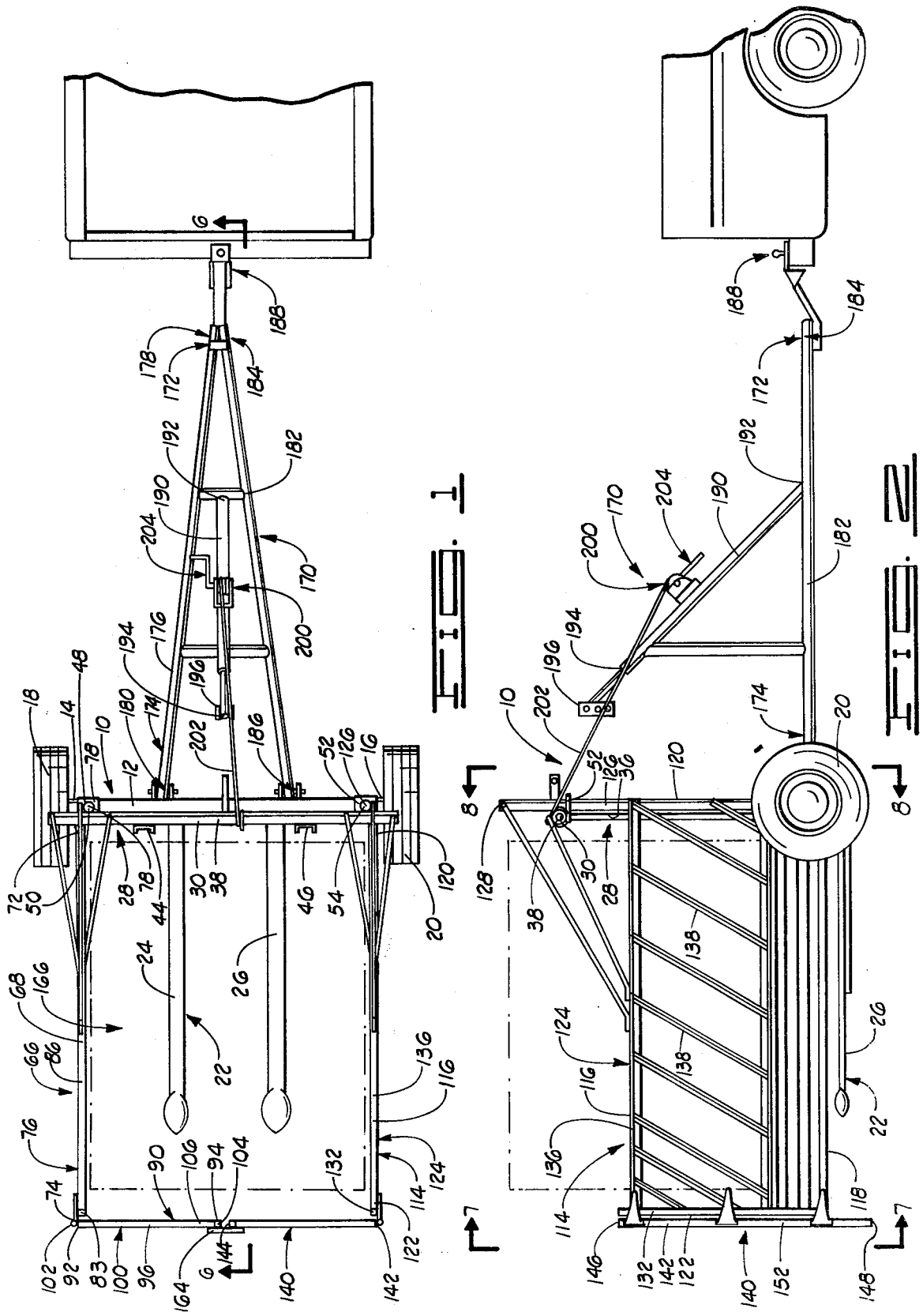

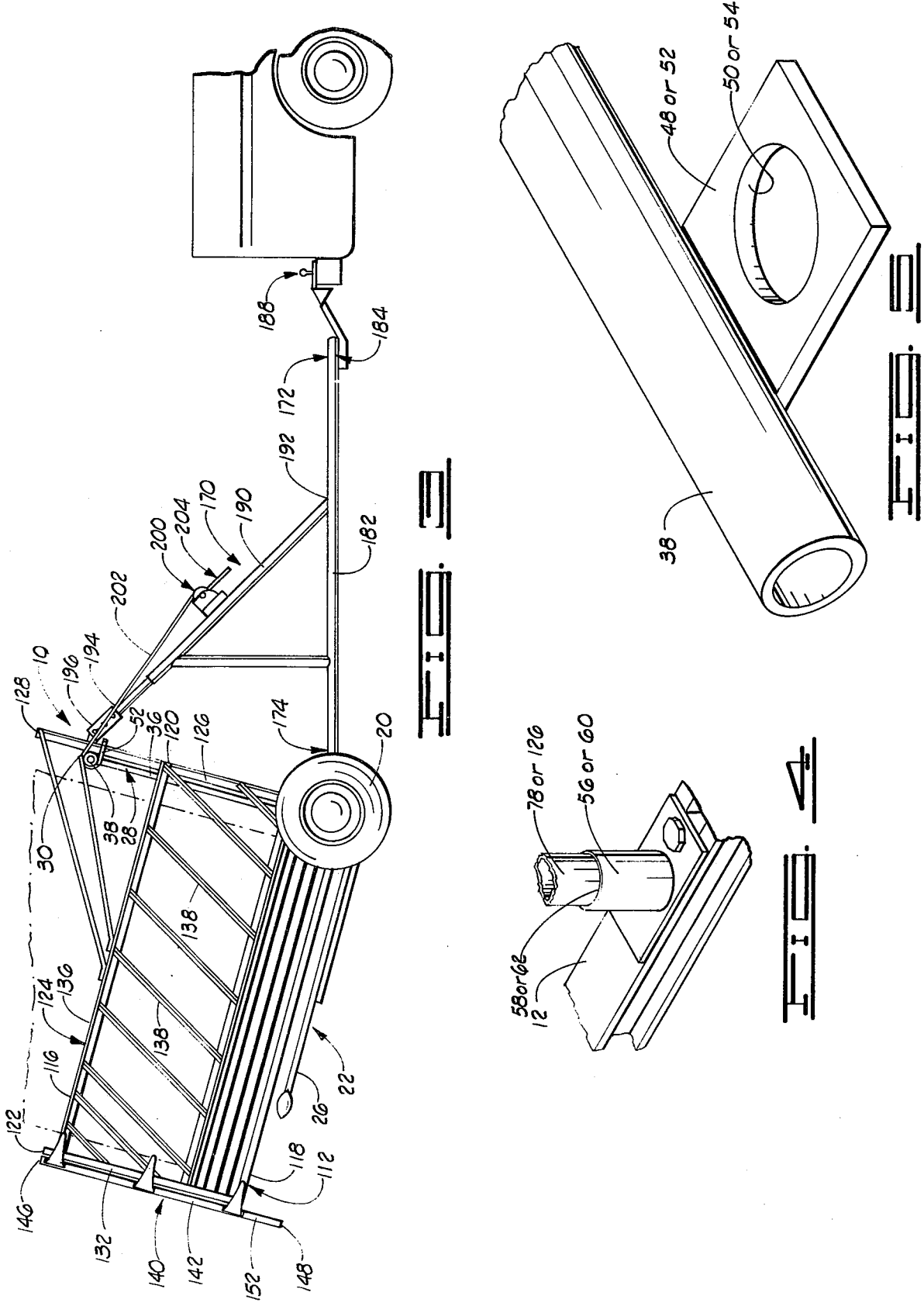

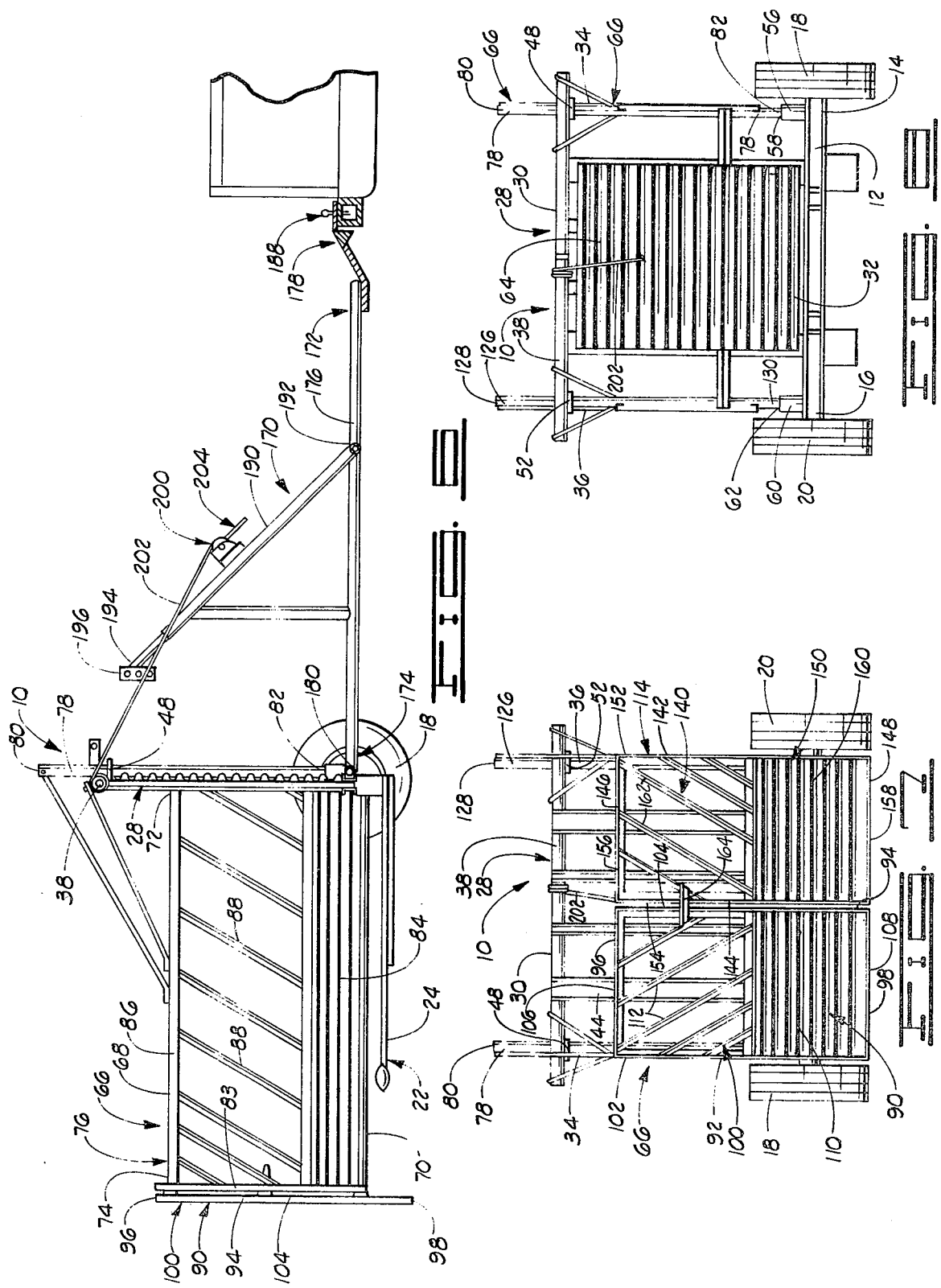

LOADER FEEDER APPARATUS FOR LOADING AND FEEDING BALES OF HAY AND THE LIKE

BACKGROUND OF THE INVENTION

Field of the Invention

The present invention relates generally to apparatus for loading, transporting and feeding bales of hay and the like.

BRIEF DESCRIPTION OF THE DRAWINGS

FIG. 1 is a top plan view of the loader feeder apparatus of the present invention shown connected to a vehicle (only a fragmentary portion of the vehicle being shown in FIG. 1) with a bale of hay and the like loaded therein (shown in dashed lines).

FIG. 2 is a side view of the loader feeder apparatus of FIG. 1, the bale of hay and the like being shown in dashed lines in FIG. 2, and the loader feeder apparatus being shown in the loading position.

FIG. 3 is a side view of the loader feeder apparatus of FIGS. 1 and 2 showing the loader feeder apparatus in the hauling position.

FIG. 4 is a fragmentary, typical view showing the connection between one of the connecting post and one of the posts of FIGS. 1, 2 and 3.

FIG. 5 is a fragmentary, typical view showing the connecting means between the crossbar and the connecting posts of FIGS. 1, 2 and 3.

FIG. 6 is a sectional view taken substantially along the lines 6—6 of FIG. 1.

FIG. 7 is an elevational view showing the rear wall assembly of the loader feeder apparatus, taken substantially along the lines 7—7 of FIG. 2.

FIG. 8 is a front elevational view showing the first and second gate assemblies, taken substantially along the lines 8—8 of FIG. 2.

DESCRIPTION OF THE PREFERRED EMBODIMENT

Referring to the drawings in general, and to FIGS. 1, 2 and 3 in particular, shown therein and designated via the general reference numeral 10 is a loader feeder apparatus which is constructed in accordance with the present invention. The loader feeder apparatus 10 is constructed to engage and pick up bales of hay and the like (a bale of hay and the like being shown in dashed lines in the drawings) from a ground surface and to transport such bales of hay and the like to various remote locations. In addition, the loader feeder apparatus 10 of the present invention is constructed to provide a feeding device wherein animals can feed on the bales of hay and the like supported within the loader feeder apparatus 10.

The loader feeder apparatus 10 includes an axle 12 (FIGS. 1 and 6) having a first end 14 and a second end 16. A first wheel 18 is rollingly and bearingly connected to the first end of the axle 12 and a second wheel 20 is rollingly and bearingly connected to the second end 16 of the axle 12. The first and the second wheels 18 and 20 cooperate to rollingly support the loader feeder apparatus 10 and the axle 12 is rotatingly supported by the first and second wheels 18 and 20 such that the axle 12 can be rotated about an axis extending generally between the opposite ends 14 and 16 of the axle 12.

A tine assembly 22 (FIGS. 1, 2, 3 and 6) is connected to the axle 12. The tine assembly 22 includes a pair of tines 24 and 26. The tine 24 has opposite ends and one end of the tine 24 is securely connected to the axle 12, the tine 24 extending a distance from the axle 12 and being spaced a distance from the first end 14 of the axle 12. The tine 26 has opposite ends and one end of the tine 26 is secured to the axle 12, the tine 26 extending a distance from the axle 12 and being spaced a distance from the second end 16 of the axle 12. The tines 24 and 26 are spaced a distance apart and are constructed to be movable to a loading position wherein the tines 24 and 26 are engagable with a bale of hay and the like for securing the bale of hay and the like to the tine assembly 22 and the tines 24 and 26 are movable to a hauling position wherein the tine assembly 22 supports the bale of hay and the like a distance above the ground surface for transporting the bale of hay and the like to various remote locations. The construction and the operation of tines, such as the tines 24 and 26 for engaging and transporting bales of hay and the like, are well known in the art and a further detailed description is not required herein.

A rear wall assembly 28 (shown more clearly in FIG. 6) is connected to the axle 12. The rear wall assembly has an upper side 30, a lower side 32, a first end 34 and a second end 36. The lower side 32 of the rear wall assembly 28 is securely connected to the axle 12 and the rear wall assembly extends a distance from the axle 12, generally perpendicular with respect to the tines 24 and 26 of the tine assembly 22 and terminating with the upper side 30 thereof. The rear wall assembly 28 includes a cross bar 38, having a first end 40 and a second end 42. The cross bar 38 is supported generally above the axle 12 by a pair of braces 44 and 46 (shown more clearly in FIG. 7), one end of each of the braces 44 and 46 being secured to the axle 12 and the opposite end of each of the braces 44 and 46 being secured to the cross bar 38. The braces 44 and 46 cooperate to support the cross bar 38 above the axle 12 in a position wherein the cross bar 38 extends in a direction generally parallel with respect to the axle 12.

A first plate 48 (shown more clearly in FIGS. 1 and 5) is connected to the cross bar 38 and extends a distance from the cross bar 38. The first plate 48 is disposed generally near and spaced a distance from the first end 40 of the cross bar 38. The first plate 48 has an opening 50 formed therethrough.

A second plate 52 (shown more clearly in FIGS. 1 and 5) is connected to the cross bar 38 and extends a distance from the cross bar 38. The second plate 52 is disposed generally near and spaced a distance from the second end 42 of the cross bar 38, the second plate 52 being spaced a distance from the first plate 48. An opening 54 is formed through the second plate 52.

One end of a first post 56 (shown more clearly in FIGS. 4 and 8) is secured to the axle 12 generally near the first end 14 of the axle 12, the first post 56 extending a distance generally upwardly from the axle 12 generally toward the cross bar 38. The first post 56 has an opening 58 formed through one end thereof and extending a distance generally therethrough. The opening 58 in the first post 56 is generally aligned with the opening 50 in the first plate 48.

One end of a second post 60 (shown more clearly in FIGS. 4 and 8) is secured to the axle 12 generally near the second end 16 of the axle 12. The second post 60 is spaced a distance from the first post 56 and the second post 60 extends a distance generally upwardly from the axle 12 generally toward the cross bar 38. An opening 62 is formed through one end of the axle 12 and the opening 62 and the second post 60 generally aligned with the opening 54 in the second plate 52.

The rear wall assembly 28 also includes a panel 64 which is constructed of a solid material. The panel 64 is connected to and supported by the braces 44 and 46. The panel 64 extends generally between the upper and the lower sides 30 and 32 and the first and the second ends 34 and 36 of the rear wall assembly 28, the upper side of the panel 64 being spaced a distance from the upper side 30 of the rear wall assembly 28.

The loader feeder apparatus 10 (shown more clearly in FIGS. 1 and 6) includes a first side wall assembly 66 having an upper side 68, a lower side 70, a first end 72 and a second end 74. The first side wall assembly 66 includes a frame 76 having an upper side forming the upper side 68 of the first side wall assembly 66, a lower side forming the lower side 70 of the first side wall assembly 66, a first end forming the first end 72 of the first side wall assembly 66 and a second end forming the second end 74 of the first side wall assembly 66.

A connecting post 78 (shown more clearly in FIGS. 4 and 6) having opposite ends 80 and 82 is secured to the first end 72 of the frame 76. A portion of the connecting post 78, generally near the end 80 thereof, extends a distance generally upwardly from the upper side of the frame 76 or, in other words, a distance generally upwardly from the upper side 68 of the first side wall assembly 66. A portion of the connecting post 78 generally near the end 80 thereof is insertable through the opening 48 in the first plate 48 and a portion of the connecting post 78 generally near the end 82 thereof is insertable into the opening 58 in the first post 56 for removably connecting the first side wall assembly 66 to the rear wall assembly 28.

The frame 76 comprises a support post 83 which is spaced a distance from the connecting post 78 and forms the second end of the frame 76 or, in other words, forms the second end 74 of the first side wall assembly 66. A panel 84 which is constructed of a solid material is connected to and extends generally between the connecting post 78 and the support post 83. One side of the panel 84 forms the lower side of the frame 76 or, in other words, the lower side 70 of the first side wall assembly 66. The panel 84 extends a distance from the lower side of the frame 76 generally toward the upper side of the frame 76 with the uppermost end of the panel 84 being spaced a distance from the upper side of the frame 76 or, in other words, the upper side 68 of the first side wall assembly 66.

The frame 76 also includes an upper side bar 86 which is connected to and extends generally between the connecting post 78 and the support post 83. One end of the upper side bar 86 is secured to the support post 83 and the opposite end of the upper side bar 86 is secured to the connecting post 78. The upper side bar 86 is spaced a distance from the uppermost side of the panel 84 and the upper side bar 86 forms the upper side of the frame 76 or, in other words, the upper side 68 of the first side wall assembly 66.

The first side wall assembly 66 includes a plurality of frame bars 88. One end of each of the frame bars 88 is secured to the upper side bar 86 and the opposite end of each of the frame bars 88 is secured to the panel 84, the frame bars 88 each extending generally between the upper side bar 86 and the panel 84. The frame bars 88 are spaced a distance apart to permit animals to feed on the hay and the like through the spaced formed between the frame bars 88.

The loader feeder apparatus 10 includes a first gate assembly 90 (shown more clearly in FIGS. 1 and 7), having a first end 92, a second end 94, an upper side 96 and a lower side 98. The first end 92 of the first gate assembly 90 is hingedly connected to the second end 74 of the first side wall assembly 66 to permit the first gate assembly 90 to be moved to a closed position, as shown in the drawings, wherein the first gate assembly 90 extends generally perpendicularly from the first side wall assembly 66 and to permit the first gate assembly 90 to be moved to an open position, wherein the first gate assembly 90 is disposed generally adjacent the first side wall assembly 66. More particularly, the first end 92 of the first gate assembly 90 is hingedly connected to the support post 83 of the first side wall assembly 66.

The first gate assembly 90 includes a rectangularly shaped frame 100 comprising a first and a second side post 102 and 104, respectively, and an upper and a lower post 106 and 108, respectively. One end of the upper post 106 is connected to the uppermost end of the first side post 102 and the opposite end of the upper post 106 is connected to the uppermost end of the second side post 104. One end of the lower post 108 is connected to the lowermost end of the first side post 102 and the opposite end of the lower post 108 is connected to the lowermost end of the second side post 104.

One end of a panel 110 is connected to the first side post 102 and the opposite end of the panel 110 is connected to the second side post 104, the panel 110 extending generally between the first and the second side post 102 and 104. The panel 110 extends from the lower side 98 of the first gate assembly 90 a distance generally toward the upper side 96 of the first gate assembly 90, the upper most end of the panel 110 being spaced a distance from the upper side 96 of the first gate assembly 90.

The first gate assembly 90 also includes a plurality of frame bars 112. One end of each of the frame bars 112 is connected to the upper post 106 and each of the frame bars 112 extends a distance generally from the upper post 106 generally toward the panel 110, each of the frame bars 112 being connected to a support generally near the uppermost side of the panel 110. The frame bars 112 are spaced apart to permit animals to feed on the hay and the like through the space between the frame bars 112.

The loader feeder apparatus 10 includes a second side wall assembly 114 (shown more clearly in FIGS. 1 and 7) having an upper side 116, a lower side 118, a first end 120 and a second end 122. The second side wall assembly 114 includes a frame 124 having an upper side forming the upper side 116 of the second side wall assembly 114, a lower side forming the lower side 118 of the second side wall assembly 114, a first end forming the first end 120 of the second side wall assembly 114 and a second end forming the second end 122 of the second side wall assembly 114.

A connecting post 126 (shown more clearly in FIGS. 7 and 8) having opposite ends 128 and 130 is secured to the first end 120 of the frame 124. A portion of the connecting post 126, generally near the end 128 thereof, extends a distance generally upwardly from the upper side of the frame 124 or, in other words, a distance generally upwardly from the upper side of the frame 124 or, in other words, a distance generally upwardly from the upper side 116 of the second side wall assembly 114. A portion of the connecting post 126 generally near the end 128 thereof is insertable through the opening 54 in the second plate 52 and a portion of the connecting post 126 generally near the end 130 thereof is insertable into the opening 62 in the second post 60 for removably connecting the second side wall assembly 114 to the rear wall assembly 28.

The frame 124 comprises a support post 132 which is spaced a distance from the connecting post 126 and forms the second end of the frame 124 or, in other words, forms the second end 122 of the second side wall assembly 114. A panel 134 which is constructed of a solid material is connected to and extends generally between the connecting post 126 and the support post 132. One side of the panel 134 forms the lower side of the frame 124 or, in other words, the lower side 118 of the second side wall assembly 114. The panel 134 extends a distance from the lower side of the frame 124 generally toward the upper side of the frame 124 with the uppermost end of the panel 134 being spaced a distance from the upper side of the frame 124 or, in other words, the upper side 116 of the second side wall assembly 114.

The frame 124 also includes an upper side bar 136 which is connected to and extends generally between the connecting post 126 and the support post 132. One end of the upper side bar 136 is secured to the support post 132 and the opposite end of the upper side bar 136 is secured to the connecting post 126. The upper side bar 136 is spaced a distance from the uppermost side of the panel 134 and the upper side bar 136 forms the upper side of the frame 124 or, in other words, the upper side 116 of the second side wall assembly 114.

The second side wall assembly 114 includes a plurality of frame bars 138. One end of each of the frame bars 138 is secured to the upper side bar 136 and the opposite end of each of the frame bars 138 is secured to the panel 134, the frame bars 138 each extending generally between the upper side bar 136 and the panel 134. The frame bars 138 are spaced a distance apart to permit animals to feed on the hay and the like through the space formed between the frame bars 138.

The loader feeder apparatus 10 includes a second gate assembly 146 (shown more clearly in FIGS. 1 and 7), having a first end 142, a second end 144, an upper side 146 and a lower side 148. The first end 142 of the second gate assembly 140 is hingedly connected to the second end 122 of the second side wall assembly 114 to permit the second gate assembly 140 to be moved to a closed position, as shown in the drawings, wherein the second gate assembly 140 extends generally perpendicularly from the second side wall assembly 114 and to permit the second gate assembly 140 to be moved to an open position, wherein the second gate assembly 140 is disposed generally adjacent the second side wall assembly 114. More particularly, the first end 142 of the second gate assembly 140 is hingedly connected to the support post 132 of the second side wall assembly 114.

The second gate assembly 140 includes a rectangularly shaped frame 150 comprising a first and a second side post 152 and 154, respectively, and an upper and a lower post 156 and 158, respectively. One end of the upper post 156 is connected to the uppermost end of the first side post 152 and the opposite end of the upper post 156 is connected to the uppermost end of the second side post 154. One end of the lower post 158 is connected to the lowermost end of the first side post 152 and the opposite end of the lower post 158 is connected to the lowermost end of the second side post 154.

One end of a panel 160 is connected to the first side post 152 and the opposite side of the panel 160 is connected to the second side post 154, the panel 160 extending generally between the first and the second side post 152 and 154. The panel 160 extends from the lower side 148 of the second gate assembly 140 a distance generally toward the upper side 146 of the second gate assembly 140, the uppermost end of the panel 160 being spaced a distance from the upper side 146 of the second gate assembly 140.

The second gate assembly 140 also includes a plurality of frame bars 162. One end of each of the frame bars 162 is connected to the upper post 156 and each of the frame bars 162 extends a distance generally from the upper post 156 generally toward the panel 160, each of the frame bars 162 being connected to a support generally near the uppermost side of the panel 160. The frame bars 162 are spaced apart to permit animals to feed on the hay and the like through the space between the frame bars 162.

In the closed position of the first and the second gate assemblies 90 and 140, respectively, the second end 94 of the first gate assembly 90 is disposed generally near and spaced a distance from the second end 144 of the second gate assembly 140. In this position, a latch 164 connects the first and second gate assemblies 90 and 140 to secure the first and second gate assemblies 90 and 140 in the closed position. In the closed position of the first and second gate assemblies 90 and 140, the rear wall assembly 28, the first side wall assembly 66, the first gate assembly 90, the second side wall assembly 114 and the second gate assembly 140 cooperate to encompass a material space 166. The tines 24 and 26 of the tine assembly 22 each extend a distance into and are disposed within the material space 166 and the bale of hay and the like is supported generally within the material space 166 during one aspect of the operation of the loader feeder apparatus 10 of the present invention.

The loader feeder apparatus 10 also includes a tongue assembly 170 having a first end 172 and an opposite second end 174, the second end 174 of the tongue assembly 170 being pivotally connected to the axle 12. The tongue assembly 170 includes a first rod having opposite ends 178 and 180, the end 180 of the first rod 176 being pivotally connected to the axle 12 generally near and spaced a distance from the first end 14 of the axle 12. The tongue assembly 170 also includes a second rod 182 having opposite ends 184 and 186, the end 186 of the second rod 182 being pivotally connected to the axle 12 generally near and spaced a distance from the second end 16 of the axle 12. The end 178 of the first rod 176 is secured to the end 184 of the second rod 182. An adapter 188 is connected to the tongue assembly 170 generally near the first end 172 of the tongue assembly 170 for removably connecting the tongue assembly 170 to a vehicle, the vehicle not being shown in the drawings.

The loader feeder apparatus 10 includes a tongue bar 190 having a first end 192 and a second end 194. The first end 192 of the tongue bar 190 is secured to the tongue assembly 170 and the tongue bar 190 extends a distance angularly upwardly from the tongue assembly 170 generally toward the rear wall assembly 28 to a position wherein the second end 194 of the tongue bar 190 is spaced near and a distance from the cross bar 38 at a position generally midway between the ends 40 and 42 of the cross bar 38.

The loader feeder apparatus 10 includes a channel 196 for removably connecting the tongue bar 190 to the cross bar 38. When the loader feeder apparatus 10 is positioned in the hauling position, one end of the channel 96 is removably secured to the tongue bar 190 by a pin generally near the end 194 of the tongue bar 190 and the opposite end of the channel 196 is removably secured to the cross bar 38 by a pin generally midway between the ends 40 and 42 of the cross bar 38.

A winch assembly 200 is secured to the tongue bar 190. The winch assembly 200 includes a cable 202 having one end thereof connected to the winch assembly 200 and the opposite end thereof connected to the cross bar 38. The winch assembly 200 is rotatable by a hand crank 204. When the hand crank 204 is rotated in one direction, the cable 202 is retreived thereby pulling the cross bar 38 in a direction generally toward the tongue assembly 170 and, when the hand crank 204 is rotated in the opposite direction, the cable 202 is released thereby allowing the cross bar 38 to be moved in a direction generally away from the tongue assembly 170.

To position the loader feeder apparatus 10 in the loading position, the channel 196 is disconnected from the tongue bar 190 and the hand crank 204 of the winch assembly 200 is rotated in a direction to permit the releasing of the cable 202. As the cable 202 is released, the rear wall assembly 28 rotates the axle 22 in a direction generally away from the tongue assembly 170 thereby rotating the time assembly 22 in a generally downwardly direction toward the ground surface. When the tines 24 and 26 of the tine assembly 22 have been positioned generally near the ground surface, the loader feeder apparatus 10 is in a loading position can be utilized to load a bale of hay and the like in the usual manner. It also should be noted that, in the loading position of the loader feeder apparatus 10, the loader feeder apparatus 10 can be utilized for feeding animals.

To position the loader feeder apparatus 10 in the hauling position, the hand crank 204 of the winch assembly 200 is rotated in a direction to cause the rear wall assembly 28 to be rotated or moved in a direction generally toward the tine assembly 22 thereby causing the axle 12 to be rotated in a direction generally toward the tongue assembly 170. When the axle 12 is rotated in the direction generally toward the tongue assembly 170, the tine assembly 22 which is connected to the axle 12 is rotated or moved in a direction generally upwardly with respect to the ground surface for supporting a bale of hay and the like a distance generally above the ground surface. When the tine assembly 22 has been rotated a sufficient distance or, in other words, raised a sufficient distance above the ground surface, the winch assembly 200 is locked in position and the channel 196 is secured to the tongue bar 190 and to the cross bar 38, thereby securing the loader feeder apparatus 10 in the hauling position. It should be noted that the connection between the first and the second rods 176 and 182 and the rear wall assembly 28 and the connection between the tongue bar 190 and the cross bar 38 cooperate to provide a three point connection for securing the loader feeder apparatus 10 in the hauling position.

To assemble the first side wall 66, the first side wall assembly 66 initially is positioned near the first end 34 of the rear wall assembly 28. The first side wall assembly 66 is maneuvered to insert the end 80 of the connecting post 78 through the opening 50 in the first plate 48, the first side wall assembly 66 then being maneuvered to position the end 82 of the connecting post 78 generally above the opening 58 in the first post 56. The first side wall assembly 66 then is lowered to position a portion of the connecting post 78 generally near the end thereof within the opening 58 in the first post 56, the connecting post 78 cooperating with the first plate 48 and the first post 56 to secure the first side wall assembly 66 to the rear wall assembly 28.

To assemble the second side wall 114, the second side wall assembly 114 initially is positioned near the first end 34 of the rear wall assembly 28. The second side wall assembly 114 is maneuvered to insert the end 128 of the connecting post 126 through the opening 54 in the second plate 52, the second side wall 114 assembly then being maneuvered to position the end 130 of the connecting post 126 generally above the opening 62 in the second post 60. The second side wall assembly 115 then is lowered to position a portion of the connecting post 126 generally near the end thereof within the opening 62 in the second post 60, the connecting post 126 cooperating with the second plate 52 and the second post 60 to secure the second side wall assembly 114 to the rear wall assembly 28.

The rear wall assembly 28, the first side wall assembly 66, the first gate assembly 90, the second side wall assembly 114 and the second gate assembly 140 each cooperate to encompass a bale of hay and the like supported by the tine assembly 22 and the rear wall assembly 28, the first side wall assembly 66, the first gate assembly 90, the second side wall assembly 114 and the second gate assembly 140 each cooperate with the tine assembly 22 to support the bale of hay and the like during the transporting of the bale of hay and the like by the loader feeder apparatus 10.

Changes may be made in the various elements and assemblies disclosed herein without departing from the spirit and the scope of the invention as defined in the following claims.

What is claimed is:

1. A loader feeder apparatus adapted to be pulled by a vehicle for loading bales of hay and the like from a ground surface, transporting the loaded bales of hay and the like and allowing animals to feed on the bales of hay and the like, comprising:

an axle having a first end and an opposite second end;
means for rotatingly supporting the axle;
a tongue assembly having a first end and an opposite second end, the second end of the tongue assembly being pivotally connected to the axle;
means for removably connecting the first end of the tongue assembly to a vehicle;
a tongue bar having a first end and an opposite second end with the first end connected to the tongue assembly, the tongue bar extending angularly from the tongue assembly with the second end of the tongue bar being spaced a distance from the second end of the tongue assembly;
a tine assembly connected to and extending a distance from the axle;
a rear wall assembly having an upper side, a lower side, a first end and a second end, the lower side being connected to the axle and the rear wall assembly extending a distance from the axle generally perpendicular to the tine assembly and terminating with the upper side thereof;
a winch assembly, having a portion removably connectable to the rear wall assembly generally near the upper side of the rear wall assembly, for moving the rear wall assembly in a direction generally toward the tongue assembly thereby rotating the axle and pivoting the tine assembly in a generally upwardly direction to a hauling position wherein the tine assembly is positioned for supporting a bale of hay and the like a distance above the ground for transporting the bale of hay and the like and for moving the rear wall assembly from the hauling position in a direction generally away from the tongue assembly thereby rotating the axle and pivoting the tine assembly in a generally downwardly direction to a loading position wherein the tine assembly is positioned for engaging a bale of hay and the like, the loader feeder apparatus being positioned for allowing animals to feed on the bale of hay and the like in the loading position;

means for removably connecting the rear wall assembly to the second end of the tongue bar when the tine assembly is in the hauling position for securing the tine assembly in the hauling position;

a first side wall assembly having a first end, a second end, an upper side and a lower side, a portion of the first side wall assembly being constructed to permit animals to feed on the hay and the like through the first side wall assembly, the first end of the first side wall being removably connected to the axle and to the first end of the rear wall assembly;

a first gate assembly having a first end, a second end, an upper side and a lower side, a portion of the first gate assembly being constructed to permit animals to feed on the hay and the like through the first gate assembly, the first end of the first gate assembly being hingedly connected to the second end of the first side wall assembly to permit the first gate assembly to be moved to an opened position and to be moved to a closed position wherein the first gate assembly extends generally perpendicularly from the first side wall assembly;

a second side wall assembly having a first end, a second end, an upper side and a lower side, a portion of the second side wall assembly being constructed to permit animals to feed on the hay and the like through the second side wall assembly, the first end of the second side wall being removably connected to the axle and to the second end of the rear wall assembly; and a second gate assembly having a first end, a second end, an upper side and a lower side, a portion of the second gate assembly being constructed to permit animals to feed on the hay and the like through the second gate assembly, the first end of the second gate assembly being hingedly connected to the second end of the second side wall assembly to permit the second gate assembly to be moved to an opened position and to be moved to a closed position wherein the second gate assembly extends generally perpendicularly from the second side wall assembly.

2. The loader feeder apparatus of claim 1 wherein the means for rotatingly supporting the axle is defined further to include:
a first wheel rollingly connected to the first end of the axle; and
a second wheel rollingly connected to the second end of the axle.

3. The loader feeder of claim 1 wherein the tongue assembly is defined further to include:

a first rod having a first end and a second end, the second end of the first rod being pivotally connected to the axle generally near and spaced a distance from the first end of the axle; and a second rod having a first end and an opposite second end being pivotally connected to the axle generally near and spaced a distance from the second end of the axle and the first end of the second rod being connected to the first end of the first rod, the first and the second rods and the tongue bar providing three connection points when the tongue bar is connected to the rear wall assembly.

4. The loader feeder of claim 1 wherein the rear wall assembly is defined further to include:
a cross bar having a first end and a second end;
means for supporting the cross bar generally above the axle, the cross bar extending generally parallel with the axle;
a first plate connected to the cross bar generally near the first end of the cross bar, having an opening formed therethrough; and
a first post secured to the axle generally near the first end of the axle having an opening formed therein and extending a distance therethrough, to include an opening formed therein and extending a distance therethrough; and
wherein the first side wall assembly is defined further to include:
a frame having an upper side forming the upper side of the first side wall assembly, a lower side forming the lower side of the first side wall assembly, a first end forming the first end of the first side wall assembly and a second end forming the second end of the first side wall assembly; and
a connecting post connected to the first end of the frame, a portion of the connecting post extending a distance generally from the upper side of the frame and being insertable through the opening in the first plate and a portion of the connecting post being insertable into the opening in the first post for removably connecting the first side wall assembly to the rear wall assembly.

5. The loader feeder apparatus of claim 1 wherein the first and the second gate assemblies are defined further as being movable to the closed positions wherein the second end of the second gate assembly is disposed near the second end of the first gate assembly; and wherein the loader feeder apparatus is defined further to include:
means for removably connecting the second end of the first gate assembly to the second end of the second gate assembly in the closed position of the first and the second gate assemblies.

6. The loader feeder apparatus of claim 5 wherein the first and the second side wall assemblies, the first and the second gate assemblies and the rear wall assembly cooperate to encompass a material area in the closed position of the first and the second gate assemblies with a portion of the tine assembly being disposed generally within the material area for supporting a bale of hay and the like generally within the material area, and the first and the second side wall assemblies, the first and the second gate assemblies and the rear wall assembly cooperate with the tine assembly to support the bale of hay and the like, and the first and the second side wall assemblies, the first and the second gate assemblies and the rear wall assembly extending generally around the bale of hay and the like in the closed position of the first and the second gate assemblies.

7. The loader feeder apparatus of claim 5 defined further to include: means for hingedly connecting the first gate assembly to the first side wall assembly to be moved to the closed position wherein the first gate assembly is disposed generally adjacent the first side wall assembly; and means for hingedly connecting the second gate assembly to the second side wall assembly to be moved to the closed position wherein the second gate assembly is disposed generally adjacent the second side wall assembly.

8. The loader feeder of claim 5 wherein the rear wall assembly is defined further to include:
- a second plate connected to the cross bar generally near the second end of the cross bar, having an opening formed therethrough; and
- a second post secured to the axle generally near the second end of the axle having an opening formed therein and extending a distance therethrough; and wherein the second side wall assembly is defined further to include:
- a frame having an upper side forming the upper side of the second side wall assembly, a lower side forming the lower side of the second side wall assembly, a first end forming the first end of the second side wall assembly and a second end forming the second end of the second side wall assembly; and
- a connecting post connected to the first end of the frame, a portion of the connecting post extending a distance generally from the upper side of the frame and being insertable through the opening in the second plate and a portion of the connecting post being insertable into the opening in the second post for removably connecting the second side wall assembly to the rear wall assembly.

9. The loader feeder of claim 8 wherein the frame of the first side wall assembly is defined further to include:
- a support post spaced a distance from the connecting post and forming the second end of the frame;
- a panel constructed of a solid material connected to and extending generally between the connecting post and the support post, one side of the panel forming the lower side of the frame and the panel extending a distance toward the upper side of the frame and being spaced a distance from the upper side of the frame;
- an upper side bar connected to and extending between the connecting post and the second end of the frame, the upper side bar being spaced a distance from the panel and forming the upper side of the frame; and
- a plurality of frame bars connected to and extending between the upper side bar and the panel, the frame bars being spaced to permit animals to feed on the hay and the like disposed in the material space through the spaces between the frame bars.

10. The loader feeder of claim 9 wherein the frame of the second side wall assembly is defined further to include:
- a support post spaced a distance from the connecting post and forming the second end of the frame;
- a panel constructed of a solid material connected to and extending generally between the connecting post and the support post, one side of the panel forming the lower side of the frame and the panel extending a distance toward the upper side of the frame and being spaced a distance from the upper side of the frame;
- an upper side bar connected to and extending between the connecting post and the second end of the frame, the upper side bar being spaced a distance from the panel and forming the upper side of the frame; and
- a plurality of frame bars connected to and extending between the upper side bar and the panel the frame bars being spaced to permit animals to feed on the hay and the like disposed in the material through the spaces between the frame bars.

11. The loader feeder of claim 10 wherein the frame of the first gate assembly is defined further to include:
- a first support post;
- a second support post spaced a distance from the first support post;
- a panel constructed of a solid material connected to and extending generally between the first and the second support posts;
- an upper side bar connected to and extending between the first and the second support posts, the upper side bar being spaced a distance from the panel; and
- a plurality of frame bars connected to and extending between the upper side bar and the panel, the frame bars being spaced to permit animals to feed on the hay and the like disposed in the material through the spaced between the frame bars.

12. The loader feeder of claim 11 wherein the frame of the second gate assembly is defined further to include:
- a first support post;
- a second support post spaced a distance from the first support post;
- a panel constructed of a solid material connected to and extending generally between the first and the second support posts;
- an upper side bar connected to and extending between the first and the second support posts, the upper side bar being spaced a distance from the panel; and
- a plurality of frame bars connected to and extending between the upper side bar and the panel the frame bars being spaced to permit animals to feed on the hay and the like disposed in the material through the spaces between the frame bars.

* * * * *